US009469779B2

(12) United States Patent
Robertson et al.

(10) Patent No.: US 9,469,779 B2
(45) Date of Patent: Oct. 18, 2016

(54) COATING COMPOSITIONS INCORPORATING INGREDIENTS HAVING SECONDARY AMINE, HYDROXYL AND ISOCYANATE FUNCTIONALITY

(71) Applicant: Valspar Sourcing, Inc., Minneapolis, MN (US)

(72) Inventors: Brian A Robertson, Colony, TX (US); Ranjit R Pachha, St. Paul, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 177 days.

(21) Appl. No.: 13/853,173

(22) Filed: Mar. 29, 2013

(65) Prior Publication Data

US 2013/0231441 A1 Sep. 5, 2013

Related U.S. Application Data

(63) Continuation of application No. PCT/US2011/054174, filed on Sep. 30, 2011.

(60) Provisional application No. 61/388,288, filed on Sep. 30, 2010.

(51) Int. Cl.

| | |
|---|---|
| *B29C 37/00* | (2006.01) |
| *B32B 27/00* | (2006.01) |
| *B32B 27/40* | (2006.01) |
| *C08G 18/38* | (2006.01) |
| *C08G 18/66* | (2006.01) |
| *C08G 18/72* | (2006.01) |
| *C08G 18/78* | (2006.01) |
| *C09D 175/02* | (2006.01) |
| *C09D 175/12* | (2006.01) |

(52) U.S. Cl.
CPC ......... *C09D 175/02* (2013.01); *B29C 37/0028* (2013.01); *B32B 27/00* (2013.01); *B32B 27/40* (2013.01); *C08G 18/3821* (2013.01); *C08G 18/6651* (2013.01); *C08G 18/725* (2013.01); *C08G 18/7831* (2013.01); *C09D 175/12* (2013.01); *B29C 2037/0035* (2013.01)

(58) Field of Classification Search
CPC ..... B32B 27/00; B32B 27/40; C08G 18/161; C08G 18/222; C08G 18/2865; C08G 18/325; C08G 18/3819; C08G 18/6529; C08G 18/6651; C08G 18/725; C08G 18/7831; C08G 18/3821; C08J 3/00; C08J 3/20; C08J 3/24; C08J 3/243; C08J 2375/02; C08J 2375/04; C08J 2375/12; C08K 3/00; C08K 3/0016; C08K 3/10; C08K 5/00; C08K 5/0091; C08K 5/56; C08K 5/57; C08L 75/00; C08L 75/02; C08L 75/04; C08L 75/12; C09D 5/04; C09D 7/002; C09D 175/00; C09D 175/02; C09D 175/04; C09D 175/12; B29C 37/00; B29C 2037/0035

USPC ......... 524/589, 590; 528/44, 55, 61, 65, 68, 528/85; 428/423.1
See application file for complete search history.

(56) References Cited

U.S. PATENT DOCUMENTS

| | | |
|---|---|---|
| 4,242,415 A | 12/1980 | Feltzin et al. |
| 4,288,586 A | 9/1981 | Bock et al. |
| 4,324,879 A | 4/1982 | Bock et al. |
| 5,126,170 A | 6/1992 | Zwiener et al. |
| 5,236,741 A | 8/1993 | Zwiener et al. |
| 5,561,214 A | 10/1996 | Yeske et al. |
| 5,580,945 A | 12/1996 | Wade et al. |
| 6,288,133 B1 | 9/2001 | Hagquist |
| 6,613,389 B2 | 9/2003 | Li et al. |
| 6,790,925 B2 | 9/2004 | Danielmeier et al. |
| 6,969,754 B2 | 11/2005 | Garner et al. |
| 2002/0002300 A1 | 1/2002 | Roesler et al. |
| 2003/0105220 A1* | 6/2003 | Gupta ............. C08G 18/3234 524/589 |
| 2005/0059792 A1 | 3/2005 | Roesler et al. |
| 2006/0155054 A1* | 7/2006 | Lenges et al. .............. 524/589 |
| 2009/0226644 A1 | 9/2009 | Wylie et al. |

FOREIGN PATENT DOCUMENTS

CA 2111927 6/1994

OTHER PUBLICATIONS

Stamenkovic et al., "Catalysis of the Isocyanate-Hydroxyl Reaction by Non-tin Catalysts in Water Borne Two Component Polyurethane Coatings", Working and Living Environmental Protection, vol. 2, No. 4, 2004, pp. 243-250.*
Author unknown, "Troubleshooting Metal Catalyzed Urethane Systems", PCI Paint & Coatings Industry, www.pcimag.com/articles/84910-troubleshooting-metal-catalyzed-urethane-systems, Sep. 26, 2000.*
He et al., "A Selective Catalyst for Two-Component Waterborne Polyurethane Coatings", Journal of Coatings Technology, vol. 74, No. 930, Jul. 2002, pp. 31-36.*
International Search Report and Written Opinion for International Application No. PCT/US2011/05474 mail date Jun. 22, 2012. (11 pages).
International Preliminary Report on Patentability for International Application No. PCT/US2011/05474 mail date Apr. 2, 2013. (8 pages).

* cited by examiner

Primary Examiner — Patrick Niland

(57) ABSTRACT

The present invention provides coating compositions with excellent curing performance. Curing can occur very rapidly for excellent cycle time, yet with minimal (if any) foaming. A preferred catalyst system helps to provide excellent initial and follow through cure through the entirety of the coating thickness, even with respect to in-mold coating (IMC) applications. Preferred aspects of the invention provide a composition having zero, or nearly zero, emissions of volatile organic compounds (VOC) when applied and cured.

8 Claims, No Drawings

COATING COMPOSITIONS INCORPORATING INGREDIENTS HAVING SECONDARY AMINE, HYDROXYL AND ISOCYANATE FUNCTIONALITY

CROSS-REFERENCE TO RELATED APPLICATION(S)

This application is a continuation-in-part of PCT Application No. PCT/US2011/054174, filed 30 Sep. 2011, and claims priority to U.S. Provisional Application Ser. No. 61/388,288, filed 30 Sep. 2010, the disclosure of which is incorporated herein by reference.

FIELD OF INVENTION

The present invention relates to coating compositions incorporating secondary amines, polyols, and isocyanate and their use to form cured coatings. In particular, the present invention relates to such coating compositions in which a catalyst system facilitates curing, wherein the catalyst system includes a first catalyst comprising aluminum and at least one additional catalyst including a catalytically active metal other than aluminum such as zirconium.

BACKGROUND OF THE INVENTION

Coating compositions can be used on a wide range of substrates for a variety of purposes. Coating compositions, for example, can be used to form coatings that impart weather resistance, wear resistance, protection against moisture; and cosmetic benefits. So-called gel coats are one kind of coating formed from coating compositions. For instance, gel coats can provide surfaces with high initial and extended gloss for long-lasting visual appeal or otherwise provide a high quality finish on the visible surface of a product. Gel coats can also be used to present desired color characteristics or other visual effects such as fluorescent, pearlescent, iridescent, metallic reflective, non-reflective, and/or retroreflective effects, or the like. Gel coats are used on a wide variety of substrates, including surfaces of marine vessels, motor vehicles, air craft, recreational vehicles, pools, countertops, appliances, bathroom fixtures, buildings and other man-made structures, sports equipment, and the like.

Gel coats are derived from curable, fluid compositions that are applied onto supporting surfaces and cured to form solid coatings. In some instances, such coatings are formed directly on the substrate to be coated. In other instances, the coating is formed against a female mold in a so-called in mold coating ("IMC") processes. At least a portion of the substrate is then fabricated in situ against the at least partially cured coating while supported by the female mold. The mold surface typically may be a specialized "tooling" gel coat that has been formulated for the construction of molds and reinforced with a low shrink unsaturated polyester resin blend with excellent thermocycling properties. Other mold surfaces, which may be heated to a desired temperature, such as a nickel-plated steel surface, are used for IMC processes.

Coating compositions based upon unsaturated polyester resins are known. Such compositions often are derived from an unsaturated polyester resin diluted with styrene and/or methyl methacrylate monomer(s). Such gel coat compositions may also contain other reactive monomers such as acrylates, methacrylates, and the like. Typical gel coat compositions also often include fillers/extenders such as aluminum trihydrate, calcium carbonate, and the like. Other ingredients commonly used in typical gel coats include application promoters, air release additives, bactericides, fungicides, antistatic agents, antioxidants, rheology agents, wetting agents, UV stabilizers, combinations of these, and the like.

Coating compositions based upon polyisocyanates and so-called polyaspartate (or polyaspartic) resins containing secondary amine groups also are known and have been described in U.S. Pat. Nos. 5,561,214; 5,126,170; 5,236,741; 5,397,930; U.S. Pat. Pub. Nos. 2005/0059792; 2002/0002300; 2009/0226644; and Canadian Application 2,111,927. These coating compositions show great promise, but technical issues remain. Curing challenges are of particular concern in in-mold coating (IMC) applications, where follow through cure after initial curing has been poor.

These amine-based compositions also are susceptible to foaming during curing reactions. This can lead to undue porosity in the cured film. Although anti-foaming agents can be used to alleviate foaming to some degree, excessive use of anti-foaming agents can adversely impact the properties of the resultant coatings.

Another challenge in IMC applications is the formation of surface defects commonly referred to as "fish eyes". These defects comprise discontinuities in the coating. Fish eyes may have a greater tendency to form when thin (e.g., 2-6 mil thick) coatings are sprayed onto a mold, especially a waxed mold due at least in part to surface tension effects. Another challenge in IMC applications is a need to re-wax the mold after too few "pulls" of articles from the mold, even when using the most advanced mold waxes.

SUMMARY OF THE INVENTION

The present invention provides coating compositions with excellent curing performance. Curing can occur very rapidly for excellent cycle time, yet with minimal (if any) foaming. A preferred catalyst system helps to provide excellent initial and follow through cure through the entirety of the coating thickness, even with respect to IMC applications. The coating compositions can be formulated with high solids content, e.g., up to 100 weight percent solids content to minimize solvent handling concerns. Preferred aspects of the invention provide a composition having zero, or nearly zero, emissions of volatile organic compounds (VOC) when applied and cured. Resultant coatings have excellent toughness, weatherability, and appearance. The coating compositions are formulated so that visual defects such as fish eyes or orange peel are minimized in the resultant coatings. The cured compositions of the invention also have excellent mold release characteristics to allow multiple releases of the coating from the mold. Additionally, preferred embodiments of the coating compositions can be formulated with internal mold release agents so that the cured compositions may release more easily from the mold. Preferred embodiments of the coating compositions also may be formulated so that foaming is dramatically reduced during curing. A preferred catalyst system, for example, is particularly effective not only to promote excellent curing characteristics but also to minimize foaming.

Even though many embodiments of coating compositions of the present invention can be formulated with no or very little solvent, the compositions still have excellent coating characteristics and can be applied to substrates using a wide variety of application techniques. These embodiments even have excellent spraying properties, which is counterintuitive as many low-solvent and solvent-free formulations are difficult if not very impractical to pump and spray.

In one aspect, the present invention provides a coating composition derived from a secondary amine component, a polyisocyante component, and a catalyst system, preferably comprising (i) a first catalyst comprising catalytically active aluminum; and (ii) a second catalyst comprising a catalytically active metal other than aluminum. A polyol component may further be included in this aspect of the invention.

In a second aspect, the present invention provides a coating composition derived from
a) a secondary amine component comprising at least one compound according to the formula

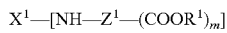

$X^1$—[NH—$Z^1$—(COOR$^1$)$_m$]

wherein each $R^1$ independently is a monovalent moiety other than H that is substantially inert with respect to being co-reactive with NCO functionality at a temperature of 150° C. or less, $X^1$ is a moiety having a valency of n that is substantially inert with respect to being co-reactive with NCO functionality at a temperature of at least 150° C. or less, $Z^1$ is a single bond or linking group with a valence of m+1; m is 1 to 20; and n is at least 1;
b) a polyol component; and
c) a polyisocyante component, wherein at least a portion of the polyisocyante component is at least tetra functional with respect to NCO based upon the total weight of the polyisocyanate component.

A catalyst system, preferably comprising (i) a first catalyst comprising catalytically active aluminum; and (ii) a second catalyst comprising a catalytically active metal other than aluminum may further be included in this and/or other aspects of the invention. This catalyst system promotes excellent curing characteristics while minimizing foaming even when curing takes place in the presence of unreacted polyol functionality.

In another aspect, the present invention provides a method of making a coating composition, comprising the steps of:
a) providing ingredients comprising:
  i) a secondary amine component;
  ii) a polyisocyante component; and
  iii) a catalyst system, comprising:
    (A) the first catalyst comprising catalytically active aluminum; and
    (B) the second catalyst comprising a catalytically active metal other than aluminum; and
b) incorporating the ingredients into a mixture.

A polyol may also be incorporated into the mixture in this aspect of the invention.

In yet another aspect, the present invention provides a method of a coating composition, comprising the steps of:
a) providing ingredients comprising:
  i) a secondary amine component comprising at least one compound according to the formula $X^1$—[NH—$Z^1$—(COOR$^1$)$_m$], wherein $X^1$—[NH—$Z^1$—(COOR$^1$)$_m$] is as defined above;
  ii) a polyol component; and
  iii) a polyisocyante component, wherein at least a portion of the polyisocyante component is at least tetra functional with respect to NCO based upon the total weight of the polyisocyanate component; and
b) incorporating the ingredients into a mixture.

In still another aspect, the present invention provides a coating composition comprising at least two parts, wherein one part comprises at least a secondary amine component, and another part comprises at least a polyisocyanate component. A polyol component may be, and preferably is, included with the secondary amine component or may be packaged in a separate component. The polyol(s), if present, usually are not packaged with the polyisocyanate component, as these components will tend to react if packaged together. In this aspect of the invention, a catalyst system may be included with either or both of the secondary amine component or the polyisocyanate component. Optional ingredients, discussed hereinafter, may also be allocated between the secondary amine component, the polyisocyanate component, or other optional component(s), if desired.

DETAILED DESCRIPTION OF PRESENTLY PREFERRED EMBODIMENTS

The present invention relates to polyurea/polyurethane coatings, coating compositions used to make these coatings, and related methods. The coating compositions of the present invention are derived from ingredients including a secondary amine component, a polyol component, and an NCO component. The secondary amine component generally includes at least one secondary amine functional compound that includes at least one secondary amine moiety, preferably 2 or more, preferably 2 to 10, more preferably 2 to 6, and even more preferably 2 to 4 secondary amine moieties per molecule on average. If more than one secondary amine moiety is present, the secondary amine moieties may be the same moiety or different. The secondary amine functionality may be incorporated into the ingredient backbone and/or may be pendant from the backbone. In addition to secondary amine functionality, the ingredient optionally may incorporate primary and/or tertiary amine functionality.

In addition to secondary amine functionality, the ingredient also desirably includes carboxyl functionality that is incorporated into the backbone or pendant from the backbone. In many embodiments, the carboxyl functionality is pendant directly from the backbone or may be linked to the backbone by a suitable linking group. Illustrative moieties having carboxyl functionality generally have the formula

—C(O)OR$^1$                     [1]

wherein each $R^1$ independently is a monovalent moiety that is substantially inert with respect to being co-reactive with NCO functionality at a temperature of 150° C. or less, preferably 300° C. or less, even more preferably 500° C. or less. In many embodiments, $R^1$ includes 1 to 30, preferably 1 to 20, more preferably 1 to 10, even more preferably 1 to 5 carbon atoms. Optionally, $R^1$ may also incorporate one or more heteroatoms such as N, S, O, combinations of these, and the like. $R^1$ may be linear, branched, or cyclic. $R^1$ may be aliphatic or aromatic, but preferably is aliphatic for good weathering characteristics in outdoor applications. In preferred embodiments, $R^1$ is linear, branched, and/or cyclic alkyl to provide the first ingredient with ester functionality, such as methyl, ethyl, propyl, isopropyl, butyl, isobutyl, and/or the like.

R1 may be saturated or unsaturated. If unsaturated, the unsaturation has the potential to react with the secondary amine functionality and thereby chain extend to form larger molecules. Thus, these unsaturated materials may self react or react with other ingredients including secondary amine functionality. Desirably, there is a stoichiometric excess of secondary amine functionality relative to unsaturation in such embodiments to help ensure that the resultant product retains secondary amine functionality.

The carboxyl content of the ingredient can vary over a wide range. In many embodiments, the molar ratio of carboxyl functionality to secondary amine functionality is at least one, preferably at least 2, more preferably is 2 to 6, even more preferably 2 to 4 on average per molecule.

A wide variety of material(s) comprising secondary amine functionality and carboxyl functionality may be used in the practice of the present invention as the first ingredient(s). One exemplary class of these materials may be represented by the formula

$$X^1-[NH-Z^1-(COOR^1)_m]_n \qquad [2]$$

wherein each $R^1$ independently is as defined above, $X^1$ is a moiety having a valence of n that is substantially inert with respect to being co-reactive with NCO functionality at a temperature of 150° C. or less, preferably 300° C. or less, even more preferably 500° C. or less; $Z^1$ is a single bond or linking group with a valence of m+1; m is 1 to 20, preferably 1 to 6, more preferably 2 to 4; and n is at least 1, preferably at least 2, and desirably is no greater than 20, preferably no greater than 10. In many embodiments, $Z^1$ includes 1 to 30, preferably 1 to 20, more preferably 1 to 10, even more preferably 1 to 5 carbon atoms. Optionally, $Z^1$ may also incorporate one or more heteroatoms such as N, S, O, combinations of these, and the like. $Z^1$ may be linear, branched or cyclic. $Z^1$ may be aliphatic or aromatic, but preferably is aliphatic for good weathering characteristics in outdoor applications. $Z^1$ may be linear, branched, and/or cyclic. Preferably each $Z^1$ is independently an alkylene moiety of 1 to 20, preferably 1 to 10, more preferably 1 to 6 carbon atoms.

One class of preferred embodiments of Formula 2 have the structure

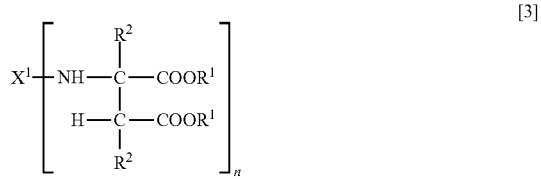

wherein $X^1$, $R^1$ and n are as defined above and each $R^3$ is independently H or $R^1$. Compounds according to Formulae 2 or 3 can be prepared in a variety of ways. For example, additional embodiments of materials according to Formulae [2] and [3] and methods of making these materials are further described in U.S. Pat. No. 6,790,925; U.S. Pat. No. 5,126,170; and U.S. Pat. Pub. No. 2002/0002300; and U.S. Pat. Pub. No. 2009/0226644. Highly branched embodiments of similar materials useful in the practice of the present invention are further described in U.S. Pat. No. 5,561,214. Flexibilized versions useful in the practice of the present invention are described in U.S. Pat. Pub. No. 2009/0226644. The respective entirety of each of these patents and patent publications is incorporated herein by reference for all purposes.

The patent literature cited herein refers to these secondary amine and carboxyl functional materials according to Formulae [2] and [3] as "polyaspartate" or "polyaspartic" derivatives due to the similarity in structure between these materials and residues of aspartic acid derivatives such as aspartic acid esters. However, this nomenclature is a misnomer in the sense that materials having amine functionality and carboxyl functionality that would be useful in the practice of the present invention would include but are not intended to be limited only to those materials incorporating residues of aspartic acid derivatives themselves. For instance, a secondary amine derivative of an aspartic acid ester has a secondary amine moiety and two ethanoate moieties (e.g., —CH2C(O)OR1), wherein R1 is as defined above) pendant from the same carbon atom. Formula [2] encompasses, but is not limited to, secondary amines having such a structure.

Consequently, embodiments of secondary amine and carboxyl functional materials useful in the practice of the present invention may be referred to as a matter of convenience as polyaspartic or polyaspartate materials, but use of this nomenclature is not intended to limit the scope of useful materials only to those incorporating aspartic residues specifically. Rather the terminology is intended to encompass any materials incorporating one or more secondary amine moieties and one or more carboxyl moieties, particularly where the carboxyl moiety is a constituent of an ester moiety.

In addition to secondary amine and carboxyl functionality, the compounds of the secondary amine component optionally may independently incorporate one or more other kinds of functionality. Examples of such other functionality include primary amines, tertiary amines, OH, keto, aldehyde, sulfate, sulfonate ammonium, phosphate, phosphonate, nitrate, nitrite, acrylonitrile, epoxy, combinations of these, and the like.

Exemplary embodiments of compounds comprising ester and secondary amine functionality that are useful as the first ingredient(s) are commercially available. Representative examples of these include Bayer XP2701, Bayer NH1220, Bayer NH1420, and Bayer NH 1520.

In addition to the secondary amine component, the ingredients of the coating composition further include an NCO (isocyanate) component comprising one or more NCO functional compounds. The NCO functional compounds react with the secondary amine functionality to form polyureas and react with OH functionality to form polyurethanes. In the presence of a suitable catalyst, such as the preferred catalyst system described below, the NCO compounds react quickly with amine and OH functionalities, but particularly fast with amine functionality. Accordingly, it is desirable to keep the NCO component separate from the amines and polyols until the time of use.

The NCO component includes one or more NCO functional constituents such that the NCO component has an average of from about 1.3 to about 8, preferably about 2 to about 6 NCO moieties per molecule. At least a portion of the NCO component, preferably from about 10% to about 100%, preferably 30% to about 100%, more preferably 50% to about 100%, even more preferably 70% to about 100%, and most preferably 90% to about 100%, of the NCO component on a weight basis comprises one or more ingredients that are at least tetrafunctional with respect to NCO functionality based upon the total weight of the NCO component. Advantageously, using such higher functional NCO compounds provides faster curing, and higher crosslink density and hardness. The one or more NCO compounds of the NCO component may be monomers, adducts, or polymers. Desirably, the NCO compounds have a molecular weight such that the resultant NCO component has a viscosity suitable for mixing with the other ingredients of the coating composition at the time of use. The resultant coating composition also should have a viscosity suitable to allow the coating composition to be applied to a substrate using the desired application technique. In practice, the NCO component as a whole desirably has a viscosity in the range from about 100 cps to about 25,000 cps, preferably about 300 cps to about 10,000 cps, more preferably about 700 to 2000 cps at 25° C. Viscosity may be measured using a Brookfield LVDVI viscometer.

The NCO component preferably is incorporated into the coating compositions as 100% solids substantially without any solvent. In some modes of practice, such as when a heated mold is used in IMC processes, the presence of too much solvent can cause performance issues. For example, if the temperature of the mold is at or near the flash point of the solvent, the solvent may flash off and may form blisters in the coating. These blisters then tend to burst or pop, leading to the formation of pin holes in the coating. The presence of too many pinholes causes undue porosity in the coating. Additionally, the cure rate may be adversely affected. As used herein, "substantially without solvent" means that the NCO includes less than 10 weight percent, preferably less than 2 weight percent, and more preferably less than about 0.25 weight percent, and even substantially 0% solvent based upon the total weight of the NCO functional solids.

NCO functional compounds may be aliphatic or aromatic. For outdoor applications, the NCO functional compounds desirably are aliphatic for good weathering performance. The NCO compounds may be linear, branched, cyclic, and/or the like.

The amount of NCO component to be used relative to the secondary amine and polyol components may vary over a wide range. As general guidelines, it is desirable that the NCO component be used in an amount such that there is a moderate stoichiometric excess of NCO moieties relative to the OH and amine moieties to minimize the amount of unreacted OH and amine (if any) in the resultant coating. A suitable stoichiometric excess is about 0.1 to about 20% on a molar basis. Preferably, the stoichiometric excess, if any, is in the range of about 5% to about 20%, more preferably in the range of about 5% to about 8% on a molar basis. A greater stoichiometric excess of NCO could be used, but this could result in too much unreacted NCO.

Non-limiting examples of diisocyanates include 1,6-diisocyanatohexane, 1-isocyanato-3,3,5-tri-methyl-5-isocyanatomethylcyclohexane (isophorone diisocyanate), 4,4-diisocyanatodicyclohexylmethane, 1,4-diisocyanatocyclohexane, 1-methyl-2,4-diisocyanatocyclohexane, 1-methyl-2,6-diisocyanatocyclohexane and mixtures thereof 4-isocyanatomethyl-1,8-octane diisocyanate, combinations of these, and the like will be used without further modification.

Polyisocyanates containing urethane groups can be used, for example, the reaction products of 2,4- and optionally 2,6-diisocyanatotoluene or 1-methyl-2,4- and optionally 1-methyl-2,6-diisocyanatocyclohexane with substoichiometric amounts of trimethylolpropane or its mixtures with simple diols, such as the isomeric propanediols or butanediols. The preparation of polyisocyanates of this kind containing urethane groups, in virtually monomer-free form, is described in, for example, DE-A 109 01 96.

Suitable isocyanates can also include oligomeric polyisocyanates including, but not limited to, dimers, such as the uretdione of 1,6-hexamethylene diisocyanate, trimers, such as the biuret and isocyanurate of 1,6-hexanediisocyanate and the isocyanurate of isophorone diisocyanate, and polymeric oligomers. Modified polyisocyanates can also be used, including, but not limited to, carbodiimides and uretdiones, and mixtures thereof. Examples of preferred polyisocyanates are those containing biuret, isocyanurate and/or iminooxadiazinedione structures. Polyisocyanates containing iminooxadiazinedione groups, and their preparation, can be found in, for example, EP-A 798 299, EP-A 896 009, EP-A 962 454 and EP-A 962 455. Particularly preferred are the aliphatic, aliphatic/cycloaliphatic and/or cycloaliphatic single-type or mixed trimers based on 1,6-diisocyanatohexane and/or isophorone diisocyanate, which are obtainable in accordance, for example, with U.S. Pat. No. 4,324,879, U.S. Pat. No. 4,288,586, DE-A 310 026 2, DE-A 310 026 3, DE-A 303 386 0 or DE-A 314 467 2, some of which are available under the designation DESMODUR® from Bayer Material Science of Pittsburgh, Pa. including DESMODUR® N 100, DESMODUR® N 3200, DESMODUR® N 3300, DESMODUR® N 3400, DESMODUR® XP 2410, and DESMODUR® XP 2580.

In addition to the secondary amine component and the NCO component, the ingredients incorporated into the coating composition may also include a polyol component including one or more polyols. A polyol as used herein is a compound and includes at least 2, preferably at least 3, and even more preferably at least 4 OH groups per molecule on average. The polyol component may be provided as a dendrimer. Dendrimers typically have an OH functionality of greater than 3, generally greater than 6 or more up to 20 or more.

The polyol component desirably is combined with the other ingredients in a manner such that the polyol component and the first ingredient(s) are co-reacted with the NCO component at the same time. When reacted in this manner, the polyol enhances catalyst function and accelerates the curing reaction without inducing excessive foaming. The polyol component is particularly beneficial when used in combination with the catalyst system described herein, preferably in the context of IMC applications. The incorporation of the polyol into the resultant cured coating also enhances toughness and flexibility.

Note that the NCO component and/or the first ingredient(s) may incorporate pre-reacted polyol ingredients. For instance, an NCO functional prepolymer could be obtained by reacting an excess of diisocyanate with a diol. Such pre-reacted polyol ingredients are not considered to be part of the polyol component for purposes of the present invention. The polyol component is intended to be those one or more polyols with available OH functionality that are co-reacted with the first ingredient(s) and the NCO component.

The amount of polyol component included in the coating composition can vary over a wide range. If too little is used, the cure rate may not be as fast as desired, and the resultant coating may be more brittle than might be desired. If too much is used, then the resultant coating could be too soft, and the coating may be subject to undue shrinking and fiber print-through. Balancing such concerns, using from about 0.25 to about 20 parts by weight of polyol component, preferably about 2 to about 10 parts by weight, per about 80 to about 100 parts by weight of the first ingredient(s) would be suitable.

Illustrative examples of polyols have weight average molecular weights of 500 to about 10,000, preferably 800 to about 6,000, and more preferably 800 to 3,500. Optionally, such polyols also may be used in combination with low molecular weight alcohols having weight average molecular weights below 500.

Examples include polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols, as these tend to be readily miscible in the coating compositions.

Preferred examples of polyester polyols are prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-ε-caprolactone, are also suitable. Other suitable polyols include polycarbonates having hydroxyl groups, which may be produced by the reaction of diols with phosgene or diaryl carbonates such as diphenyl carbonate.

Polyol(s) preferably are incorporated into the coating compositions as 100% solids substantially without any solvent. In some modes of practice, the presence of such solvent can cause performance issues such as solvent popping, porosity, and slow cure. As used herein, "substantially without solvent" with respect to polyol means that the polyol as supplied includes less than about 20 weight percent, preferably less than about 10 weight percent, more preferably less than about 2 weight percent, preferably less than about 0.5 weight percent, and more preferably zero weight percent solvent based upon the total weight of the polyol and solvent (if any) as supplied.

Exemplary polyols are commercially available. Examples include Joncryl® 507 (supplied as 80% by weight solids in 20% butyl acetate, and may be used as is or treated to reduce the solvent content), available from BASF, Vralac® SY946 available from DSM Neoresins, Albodur® resin available from Alberdingk Boley GmbH, Desmophen® VP LS 22491/1 and Desmophen® R12A available from Bayer.

One or more catalysts may be incorporated into the coating compositions in order to promote the reaction between the amine and OH functionality on the one hand and the NCO functionality on the other hand. A wide range of one or more catalysts may be used. However, a type of catalyst system has been found to be advantageous, particularly for IMC applications. Curing in the context of IMC applications has been challenging. In some instances, curing may start and even reach a gel stage, but further curing occurs too slowly if at all. It also has been difficult to obtain full curing through the full thickness of the coating composition. It has been found that a catalyst system comprising a first catalyst incorporating aluminum and a second catalyst comprising a metal other than aluminum, preferably Zr, provides improved curing performance. This catalyst system provides excellent curing through the full thickness of the coating, provides an excellent balance between rapid curing with a reasonable pot life, and helps to minimize foaming. The catalyst system has been observed to be even more effective when the coating composition includes a polyol component as well as a secondary amine component. The second catalyst containing at least one catalytically active metal other than Al promotes good front end curing and is selective for OH relative to water. The first catalyst containing aluminum provides excellent follow up curing and offers a longer pot life.

In contrast to this system, common catalysts such as dibutyltin dilaurate can provide some curing, but undue foaming can occur in IMC contexts. The cured coatings may also be more prone to poor follow-through cure when using such a common catalyst, event with relatively fast front end curing.

The aluminum of the first catalyst and/or the metal of the second catalyst may be provided in a wide range of forms. Preferably, these are provided in the form of metal chelates. The metal chelates provide good anti-foaming properties; aid in maintaining the dispersion of the components; and help provide a more complete and faster cure of the available functionalities. These benefits are especially useful in obtaining thicker coatings. It is also desirable if the catalysts are pre-mixed with one or more pot life extenders such as 2,4-pentanedione or the like. Such pot life extender(s) help to moderate the catalyst activity to allow more complete reaction of NCO before the pot life is exceeded. In practical effect, such an additive extends the pot life of the composition so that more complete curing occurs.

The ratio of the first and second catalysts can vary over a wide range. In many embodiments, the weight ratio of the first catalyst to the second catalyst is in the range from about 1:50 to about 50:1, preferably about 1:10 to about 10:1, even more preferably about 1:4 to 4:1, and even more preferably, about 1:1.5 to 1:3. The amount of catalyst used in the coating composition as a whole also can vary over a wide range. In many embodiments, using from about 0.01 to about 1 pbw, preferably about 0.03 to about 0.07 parts by weight of each catalyst per about 20 to about 100 parts by weight, preferably per about 90 parts by weight of the secondary amine component would be suitable.

In a preferred embodiment, the first catalyst is obtained commercially as the K-KAT® 5218 catalyst (aluminum chelate in 2,4-pentanedione) from King Industries, and the second catalyst is obtained commercially as the K-KAT® 4205 catalyst (Zr chelate in 2,4-pentanedione) also from King Industries. Using about 1 part by weight of the first catalyst per two parts by weight of the second catalyst in this embodiment has been found to be suitable.

Coating compositions of the present invention can optionally include additional additives, as are known in the art. Examples of these include thickeners, organic and inorganic fillers, emulsifiers, surface-active stabilizers, pigments, dyes, UV-stabilizers, flow modifiers, antioxidants, fibers or other reinforcing materials, antistatic agents, plasticizers, moisture scavengers, antifoaming agents, mold release agents, air release additives, thixotropes, leveling additives, flame retardants, dispersants, biocides, fungicides, coloring agents or other visual enhancement additives, and the like.

Many conventional in-mold coating strategies avoid internal (i.e., an ingredient incorporated into the coating composition itself) mold release agents, such as wax or the like, primarily because the use of such materials may not provide adequate self-release properties, particularly when higher temperature resistant molds are used. Additionally, the internal release agents can cause haze in the final coating, blistering and blushing, and reduced interlaminary adhesion. It has been discovered that the compositions of the present invention may contain one or more internal mold release agents without suffering these problems to an undue degree.

Preferred internal mold release agent(s) are in the form of particles comprising at least one wax. Preferred particles have a mean particle size of less than about 25 microns, preferably from about 0.05 microns to about 25 microns, preferably from about 0.2 micron to about 10 microns, and more preferably from about 2 microns to about 5 microns. Exemplary particles may comprise a wide variety of waxes such as those incorporating fluoropolymer(s) and/or polyolefin(s). A preferred fluoropolymer is a polytetrafluoroethylene (PTFE) homopolymer. A preferred polyolefin is polyethylene (PE). The particles desirably have a relatively high weight average molecular weight of greater than about 50,000, preferably greater than about 75,000, and even greater than about 100,000 and even up to 3,000,000 or more. The high molecular weight in combination with the small particle size allows the particles to remain dispersed throughout in the coating composition of the invention during the coating and the curing process. As a result, the particles retain their ability to provide release properties to the cured coating composition.

Examples of useful internal mold release additives are the Algoflon® and the Polymist® series of PTFE particle waxes available from Solvay, and the Everglide® and Ultraglide® series of PTFE particle waxes available from Shamrock.

The amount of wax particles incorporated into coating compositions may vary over a wide range. In exemplary embodiments, the particles may comprise from about 2 to about 20 weight percent, more preferably from about 5 to about 10 weight percent of component A, discussed more fully below.

Air release agents facilitate the release of entrapped air from the uncured coating composition, help to reduce foaming of the composition during cure, and assist in providing and maintaining a porosity-free film. These additives typically comprise from about 0.1 weight percent to about 20 weight percent, preferably from about 0.2 to about 5 weight percent, and more preferably about 0.2 to about 1 weight percent of the of the formula based upon the total weight of the air release additives, the polyol component, and the secondary amine component. Examples of useful air release agents include OMG Borchi® Gol 0011 (available from OMG Borcher GmbH), Tego® 980 (available from Evonik Industries), and BYK® 500 (available from BYK Chemie).

Thixotropes are especially useful in providing good flow and anti-sag properties to the uncured coating composition without unduly introducing or entrapping air or voids. They also aid in preventing the formation of fish eyes and other surface defects. Thixotropes useful in the present invention can be selected from a wide variety of materials. Preferably, the thixotrope is selected Cabot M5 amorphous silica available from Cabot, and Disparlon® polyamide wax available from King Industries. When the Cabot material is used as the thixotrope, it typically comprises from about 0.2 to about 6, preferably from about 0.5 to about 2, weight percent of the formula based upon the total weight of the thixotrope(s), the polyol component, and the secondary amine component. When the King Industries material is used as the thixotrope, it typically comprises from about 0 to about 3 weight percent, preferably from about 0.25 to about to 1 weight percent of the formula based upon the total weight of the thixotrope(s), the polyol component, and the secondary amine component.

The coating compositions ingredients often are supplied in two or more separately packaged parts that are mixed at the point of use and applied onto the desired substrate. Typically, a first part (Part A) includes at least the secondary amine component, and a second part (Part B) includes at least the NCO component. The polyol component can be in a third part or more conveniently is packaged in the first part with the secondary amine component. The other ingredients of the composition may be allocated among the parts as desired, but often are packaged in the first part. Keeping the NCO component separate from the secondary amine and polyol components until mixing prevents premature curing and allows the separate parts to be packaged and stored with long shelf life.

In use, the separate parts are mixed together and coated onto the desired substrate to form polyurea/polyurethane coatings. For IMC applications, the substrate is often a female mold optionally coated with a release agent. Additional layers of the composite structure being fabricated can then be formed over the in mold coating as desired.

A variety of mixing and application techniques can be used to form coatings using the coating compositions of the invention. Preferably, a spray system is used that mixes the separate parts together and then promptly dispenses the mixture onto the substrate where curing takes place. Other application techniques also may be used. These include knife coating, brushing, rolling, curtain coating, spin coating, extruding, and the like. Viscosity may be adjusted to some degree by heating the composition at the time of use, although this can accelerate curing and reduce pot life.

The coating compositions may be applied at a thickness over a wide range. In exemplary IMC applications, coating thickness conveniently may be in the range from about 1 mil to about 75 mils, preferably about 2 mils to about 35 mils, even more preferably about 2 mils to about 6 mils.

The compositions preferably are formulated to yield cured coatings with a tack-free time in the range from 10 seconds to 90 minutes, more preferably about 1 minute to about 10 minutes. The coatings are versatile enough to be formulated for relatively fast or relatively slow curing as desired. The tack-free time can be adjusted up or down depending on the needs of the user.

Cured coatings of the present invention may be developed from a single coated layer or may be developed from multiple layers to build up a desired thickness. Optionally, reinforcing materials such as fibers, fiberglass glass cloth, mat, or roving can be interposed between or incorporated into the layers. Reinforcing material such as fibers also can be incorporated into the compositions themselves.

In one mode of use, the coatings of the invention can be applied onto a substrate as a topcoat. Exemplary articles that can be top coated in this way include bathtubs, showers, sinks, appliances, furniture, industrial equipment, plumbing, building structures, trim, marine craft, motor vehicles, aircraft, decking, fencing, recreational vehicles, and the like. Additional suitable substrates include but are not limited to those incorporating natural or synthetic stone, metals, ceramics, glass, brick, cement, concrete, wallboard, drywall, sheetrock, cement board, plywood and other man-made panels, polymer, paper, cardboard, PVC, Styrofoam, woven and nonwoven fabric, asphalt, soil, gravel, and the like.

For IMC modes of use, the coatings of the present invention can be used either as an IMC or as another layer of a composite structure. In an exemplary instance, the coating compositions are applied to a mold surface as a in mold coating. The resultant cured coatings would be readily demoldable, allowing the resultant structure to be relatively easily removed from the mold. After the coating composition is cured, subsequent materials can be applied to fabricate the desired structure. IMC fabrication techniques can be also be used to fabricate bathtubs, showers, sinks, appliances, furniture, industrial equipment, plumbing, building structures, trim, marine craft, motor vehicles, aircraft, decking, fencing, recreational vehicles, the other additional substrates as noted above, and the like.

In order to achieve more desirable application properties for a film when a nearly zero or zero VOC IMC coating is employed, the coating composition preferably has a viscosity, when measured at 25° C. using a Brookfield RVF viscometer spindle #4 at 20 rpm of from about 1,000 to about 10,000 centipoises (cps), more preferably from about 2,000 to about 8,000 cps, and more preferably from about 2,500 to about 5,500 cps and a thixotropic index of preferably from about 1.5 to about 8, more preferably from about 2 to about 6, and even more preferably from about 2 to about 4.

The present invention will now be further described with respect to the following illustrative examples.

Example 1

A first Part B polyisocyanate component is prepared in which the Desmodur XP2410 aliphatic polyisocyanate product (Bayer Materials Science) constitutes 100% of the first Part B. This particular Part B is referred to herein as Part B1. In the examples below, Part B1 is mixed with one or more of the Part A compositions to prepare coating compositions of the present invention. The Desmodur XP2410 aliphatic polyisocyanate product includes about 23.5 weight percent NCO content and has an NCO equivalent weight of 175. This is a low viscosity, aliphatic polyisocyanate based on hexamethylene diisocyanate (HDI).

Example 2

A second Part B polyisocyanate component is prepared in which the Desmodur XP2410 aliphatic polyisocyanate product constitutes 90% by weight of the second Part B and the Desmodur N100 aliphatic polyisocyanate product constitutes 10% by weight of the second part B. This particular Part B is referred to herein as Part B2. In the examples below, Part B2 is mixed with one or more of the Part A compositions to prepare coating compositions of the present invention. The Desmodur N100 aliphatic polyisocyanate product includes about 22 weight percent NCO content and has an NCO equivalent weight of 191. This aliphatic polyisocyanate is an HDI biuret with a moderately high viscosity.

Example 3

Part A component (Part A1) is prepared from the ingredients shown in the following table. Part A1 was combined with Part B2 to prepare a coating composition. Characteristics of the coating composition are also provided in the following table.

To make Part A1, a pre-blended pigment paste is prepared using the black pigment and the moisture scavenger. These are blended with a portion of the amine resin and the polyol so that the pre-blended pigment paste includes 83.50 weight percent of the amine resin, 4 weight percent of the air release agent, 5 weight percent of the moisture scavenger, and 7.5 weight percent of the black pigment. The amine resin is loaded into a vessel. Under low agitation, the air release agent and the moisture scavenger are added. Then the black pigment is added slowly under low agitation. The resultant admixture is mixed under high shear to a minimum grind of Hegaman 6-7 to obtain the pigment paste.

Separately, the remaining amine resin is loaded into a different vessel, and then the polyol is added. Under low agitation, the remaining air release agent is added. With low agitation, the thixotrope is slowly added. When these ingredients are well mixed, the admixture is mixed under high shear to a minimum grind of Hegeman 6. Then, the flow additive, the stabilizer and the catalysts are added under low agitation. The pre-blended pigment paste is then added. The resultant admixture is mixed under low agitation for 10 minutes. Agitation is stopped and the vessel sides are scraped to accumulate the admixture together. The admixture is then mixed under low agitation for 10 minutes to from Part A1.

100 parts of Part A1 is mixed with 105 parts of Part B2 on an equivalent weight basis to obtain a coating composition.

| PART A1 | |
|---|---|
| INGREDIENT: | WEIGHT PERCENT: |
| DSM SY946 polyester polyol | 10 |
| DESMOPHEN XP 2701 a, ome resin | 84.45 |
| TEGO AIREX 980 air release agent | 1 |
| BORCHER BAYSILONE OL17 flow additive | 0.2 |
| TIN 123 uv stabilizer | 0.5 |
| KING IND 4205 catalyst | 0.065 |
| KING IND 5218 catalyst | 0.035 |
| Cabot M5 thixotropic agent | 1.25 |
| VULCN XC72R BLACK PIGMENT | 1.5 |
| MOMENTIVE SILQUEST A-171 moisture scavenger | 1 |
| Cup Gel RT (Minutes) | 3.0-5.0 |
| Film tack free time (TFT, minutes) | 1.5-2 |

Example 4

Using the ingredients shown in the following table, Part A2 was prepared according to the procedure of Example 3 except no catalyst is used. 100 parts of Part A2 is mixed with 105 parts of B2 on an equivalent weight basis to obtain a coating composition. Characteristics of the coating composition are also provided in the following table.

| PART A2 | |
|---|---|
| INGREDIENT: | WEIGHT PERCENT: |
| DESMOPHEN XP 2701 | 50 |
| BAYER DESMOPHEN NH 1520 | 34.55 |
| BAYER DESMOPHEN R12 | 10 |
| TEGO AIREX 980 | 1 |
| BORCHER BAYSILONE OL17 | 0.2 |
| TIN 123 | 0.5 |
| Cabot M5 | 1.25 |
| VULCN XC72R BLACK PIGMENT | 1.5 |
| MOMENTIVE SILQUEST A-171 | 1 |
| Cup Gel RT (Minutes) | 16-20 |
| Film Gel @ 25 C. (Minutes) | 60 |

Example 5

Using the formulation shown in the following table, Part A3 was prepared according to the procedure of Example 3 except that two kinds of amine resins are used and no polyol is used. 100 parts of Part A3 is mixed with 105 parts of B2 on an equivalent weight basis to obtain a coating composition. Characteristics of the coating composition are also provided in the following table.

| PART A3 | |
|---|---|
| INGREDIENT: | WEIGHT PERCENT: |
| DESMOPHEN XP 2701 | 64.45 |
| BAYER DESMOPHEN NH 1420 amine resin | 30 |
| TEGO AIREX 980 | 1 |
| BORCHER BAYSILONE OL17 | 1 |
| TIN 123 | 0.2 |
| KING IND 4205 | 0.065 |
| KING IND 5218 | 0.035 |
| Cabot M5 | 1.25 |
| VULCN XC72R BLACK PIGMENT | 1.5 |
| MOMENTIVE SILQUEST A-171 | 1 |
| Cup Gel RT (Minutes) | 10.0-15.0 |
| Film Gel @ 25 C. (Minutes) | 5.0-20.0 |

Example 6

Using the procedures of Example 3, coating compositions are prepared using the Part A's and Part B2 as shown in the following table. Characteristics of the coating compositions and resultant coatings also are reported in the following table.

| Ingredient | Parts by weight | | | | | | | | | | |
|---|---|---|---|---|---|---|---|---|---|---|---|
| Part | A4 | A5 | A6 | A7 | A8 | A9 | A10 | A11 | A12 | A13 | A14 |
| Polyaspartic | | | | | | | | | | | |
| XP2701 | 94.9 | 94.9 | 84.9 | 84.9 | 84.9 | 84.9 | 84.9 | 84.9 | 84.9 | 84.9 | 84.9 |
| Polyol | | | | | | | | | | | |
| DSM SY-946 | | | 10 | | | | | | | | |
| BASF Joncryl 507 | | | | 10 | | | | | | | |
| Bayer D-2249 | | | | | 10 | | | | | | |
| Perstorp Capa 4101 | | | | | | 10 | | | | | |
| Stephan PS 2502A | | | | | | | 10 | | | | |
| Bayer R-12A | | | | | | | | 10 | | | |
| Perstorp Boltron P500 | | | | | | | | | 10 | | |
| Perstorp Polyol R6405 | | | | | | | | | | 10 | |
| Bayer NH 1520 | | | | | | | | | | | 10 |
| CATALYST | | | | | | | | | | | |
| King 4205 | 0.065 | 0 | 0.065 | 0.065 | 0.065 | 0.065 | 0.065 | 0.065 | 0.065 | 0.065 | 0.065 |
| King 52018 | 0.035 | 0 | 0.035 | 0.035 | 0.035 | 0.035 | 0.035 | 0.035 | 0.035 | 0.035 | 0.035 |
| Air-Release | 1 | 1 | 1 | 1 | 1 | 1 | 1 | 1 | 1 | 1 | 1 |
| Thixotrope | 1 | 1 | 1 | 1 | 1 | 1 | 1 | 1 | 1 | 1 | 1 |
| Black Pigment | 1.5 | 1.5 | 1.5 | 1.5 | 1.5 | 1.5 | 1.5 | 1.5 | 1.5 | 1.5 | 1.5 |
| Moisture Scavenger | 1 | 1 | 1 | 1 | 1 | 1 | 1 | 1 | 1 | 1 | 1 |
| UV Additive | 0.5 | 0.5 | 0.5 | 0.5 | 0.5 | 0.5 | 0.5 | 0.5 | 0.5 | 0.5 | 0.5 |
| Part B: | | | | | | | | | | | |
| B2 (equivalent weight basis) | 105 | 105 | 105 | 105 | 105 | 105 | 105 | 105 | 105 | 105 | 105 |
| | A4 | A5 | A6 | A7 | A8 | A9 | A10 | A11 | A12 | A13 | A14 |
| Characteristics | | | | | | | | | | | |
| Pot Life@77 F., minutes | 13 | 11 | 5 | 8 | 3.5 | 5 | 5 | 6.5 | 4 | 5.5 | 12.5 |
| 70 C. Tack Free time | 10* | 11.5 | 2 | 5** | 3 | 3.5** | 4 | 5 | 2.5 | 4.4 | 13** |
| RT Tack Free Time | 8.5 | 9.5 | 5 | 5 | 4.5 | 5.5 | 5.5 | 7 | 6.5 | 7 | 5 |
| 70 C. Hardness @ 20 min | Elastic | Elastic | 2-3H | 2-3H | 2H | 1-2H | 1H | 1H | 1-2H | 1H | Elastic |
| 70 C. Hardness @ 30 min | 2H | 1H | 3H+ | 2-3H | 2-3H | 2H | 2H+ | 1-2H | 2H | 1-2H | Elastic |
| 70 C. Harness @ 24 Hr | 3-4H | 3-4H | 3-4H | 3-4H | 3H+ | 3H+ | 3H+ | 3H− | 2H-3 | 3H+ | 3H+ |
| RT Hardness @ 20 min | Elastic | Elastic | <1H | <1H | 1H | <1H | <1H | Elastic | <1H | Elastic | Elastic |
| RT Hardness @ 30 min | 1-2H | 1H | 2-3H | 2H | 1-2H | <1H | 1-2H | <1H | <1H | 1H | 1H |
| RT Hardness @ 24 Hr | 3H+ | 3H+ | 3-4H | 3H | 3H− | 3-4H | 3-4H | 3H− | 3H | 3H | 3H |

*Huge Fish Eyes
**Slight Fish Eyes

Example 7

Using the procedures of Example 3, coating compositions are prepared using the Part A's and Part B2 as shown in the following Table. Characteristics of the coating compositions and resultant coatings also are reported.

|  | Parts by weight | | |
| --- | --- | --- | --- |
|  | A15 | A16 | A17 |
| Part A Ingredient Polyaspartic |  |  |  |
| XP2701 Polyol | 84.9 | 84.9 | 84.9 |
| DSM S-946 XP-2701 Bayer D-2249 CATALYST | 10 | 10 | 10 |
| DBTL |  |  | 0.1 |
| King 4205 | 0.065 |  |  |
| King 52018 | 0.035 |  |  |
| PTSA |  |  | 0.1 |
| Air- Release | 1 | 1 | 1 |
| Thixotrope | 1 | 1 | 1 |
| Black Pigment | 1.5 | 1.5 | 1.5 |
| Moisture Scavenger | 1 | 1 | 1 |
| UV Additive | 0.5 | 0.5 | 0.5 |
| Part B2 (equivalent weight basis) | 105 | 105 | 105 |
| Pot Life@77 F., minutes | 5 | 2.5 | 7.5 |
| Cure Time | 2 | 4 | 12 |
| Film Hardness @ 2 hrs | 3H+ | 1H | <1H |
| Film Porosity | 9.0/10 | 0/10 | 9.0/10 |
| Surface | OK | Foamy | OK/Soft |

In terms of porosity, the assessment scale runs from 0 to 10. A higher number indicates less porosity. Thus, a value of 0 indicates an extremely porous film, while a value of 9 indicates a film with very low porosity.

Example 8

Using the procedures of Example 3, coating compositions are prepared using the Part A's and Part B2 as shown in the following Table. Characteristics of the coating compositions and resultant coatings also are reported.

|  | Parts by weight | | | |
| --- | --- | --- | --- | --- |
|  | A18 | A19 | A20 | A21 |
| Part A Ingredient Polyaspartic |  |  |  |  |
| XP2701 Polyol | 85.9 | 84.9 | 84.9 | 84.9 |
| DSM S-946 CATALYST | 10 | 10 | 10 | 10 |
| King 4205 | 0.065 | 0.065 | 0.065 | 0.065 |
| King 52018 Air- Release | 0.035 | 0.035 | 0.035 | 0.035 |
| Borchi 011 |  | 1 |  |  |
| Tego 980 |  |  | 1 |  |
| Anti foam -A |  |  |  | 1 |
| Thixotrope | 1 | 1 | 1 | 1 |
| Black Pigment | 1.5 | 1.5 | 1.5 | 1.5 |
| Moisture Scavenger | 1 | 1 | 1 | 1 |
| UV Additive Part B | 0.5 | 0.5 | 0.5 | 0.5 |
| B2 (Equivalent weight basis) | 105 | 105 | 105 | 105 |
| Pot Life@77 F., minutes | 5 | 5 | 5 | 5 |
| Cure Time | 2 | 2 | 2 | 2 |
| Film Hardness @ 2 hrs | 3H+ | 3H+ | 3H+ | 3H+ |
| Film Porosity | 0/10 | 9.0/10 | 9.0/10 | 9.0/10 |
| Surface | Foamy | OK | OK | Fish Eyes |

Example 9

Using the procedures of Example 3, coating compositions are prepared using the Part A's and Part B2 as shown in the following Table. Characteristics of the coating compositions and resultant coatings also are reported.

|  | Parts by weight | | |
| --- | --- | --- | --- |
|  | A22 | A23 | A24 |
| Part A Ingredient Polyaspartic |  |  |  |
| XP2701 Polyol | 84.9 | 79.9 | 83.9 |
| DSM S-946 CATALYST | 10 | 10 | 10 |
| King 4205 | 0.065 | 0.065 | 0.065 |
| King 52018 Air- Release | 0.035 | 0.035 | 0.035 |
| Borchi 011 | 1 | 1 | 1 |
| Internal Mold Releas | 0 | 0 | 0 |
| Solvay Algoflon L203 | 0 | 5 | 0 |
| Mold Wiz INT 1201 | 0 | 0 | 1 |
| Thixotrope | 1 | 1 | 1 |
| Black Pigment | 1.5 | 1.5 | 1.5 |
| Moisture Scavenger | 1 | 1 | 1 |
| UV Additive Part B | 0.5 | 0.5 | 0.5 |
| B2 (Equivalent weight basis) | 105 | 105 | 105 |
| Pot Life@77 F., minutes | 5 | 5 | 5 |
| Cure Time | 2 | 2 | 2 |
| Film Hardness @ 2 hrs | 3H+ | 3H+ | 3H+ |
| Film Porosity | 9/10 Minimal | 7/10 Some | 9/10 Minimal |
| Release | 0/10 | 9.0/10 | 3.0/10 |

A release factor of 0 indicates that the resultant coating was strongly adhered to a metal surface on which the coating was formed. A release factor of 3 indicates that the coating could be scraped off in pieces with some residue left behind. A release factor of 9 indicates that, with some initial prying, the coating thereafter released cleanly and in one piece from the metal surface.

Example 10

A coating composition is prepared using the procedure of Example 3, except that Part B1 is substituted for Part B2.

Example 11

A coating composition is prepared using the procedure of Example 4, except that Part B1 is substituted for Part B2.

Example 12

A coating composition is prepared using the procedure of Example 5, except that Part B1 is substituted for Part B2.

Example 13

Coating compositions are prepared using the procedure of Example 6, except that Part B1 is substituted for Part B2 in each sample.

Example 14

Coating compositions are prepared using the procedure of Example 7, except that Part B1 is substituted for Part B2 in each sample.

Example 15

Coating compositions are prepared using the procedure of Example 8, except that Part B1 is substituted for Part B2 in each sample.

Example 16

Coating compositions are prepared using the procedure of Example 9, except that Part B1 is substituted for Part B2 in each sample.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims. Each patent, published patent application, technical article, and any other publication referred to herein is incorporated herein by reference in its respective entirety for all purposes.

What is claimed is:

1. A coating composition derived from ingredients, comprising:
    a) a secondary amine component;
    b) a 100% solids polyisocyanate component; and
    c) a catalyst system, comprising:
        (i) a first catalyst comprising catalytically active aluminum; and
        (ii) a second catalyst comprising a catalytically active zirconium,
wherein the first catalyst and the second catalyst are present in a ratio of 1:10 to 10:1 parts by weight, and wherein the composition is applied to a mold surface as an in-mold coating.

2. A coating composition according to claim 1, further comprising d) a polyol component.

3. The coating composition of claim 1, wherein
    the secondary amine component comprises at least one compound according to the formula $$X^1-[NH-Z^1-(COOR^1)_m]_n$$

wherein each $R^1$ independently is a monovalent moiety other than H that is substantially inert with respect to being co-reactive with NCO functionality at a temperature of 150° C. or less, $X^1$ is a moiety having a valency of n that is substantially inert with respect to being co-reactive with NCO functionality at a temperature of at least 150° C. or less, $Z^1$ is a single bond or linking group with a valence of m+1; m is 1 to 20; and n is at least 1 and no greater than 20.

4. A cured coating obtained from a composition of claim 1.

5. A coating composition according to claim 1, further comprising an air release additive.

6. A coating composition according to claim 1, further comprising a thixotrope.

7. The composition of claim 1, wherein the first and second catalysts are present in a ratio of 1:1.5 to 1:2.

8. The composition of claim 1, wherein the first catalyst is an aluminum chelate in 2,4-pentanedione, and the second catalyst is a zirconium chelate in 2,4-pentanedione.

* * * * *